United States Patent
Akbulut et al.

(10) Patent No.: US 9,535,690 B2
(45) Date of Patent: *Jan. 3, 2017

(54) CONFIGURATION MANAGEMENT OF ENGINEERING ARTIFACTS WITH AUTOMATIC IDENTIFICATION OF RELATED CHANGE SETS BASED ON TYPE SYSTEM

(71) Applicant: International Business Machines Corporation, Armonk, NY (US)

(72) Inventors: Muhtar B. Akbulut, Waban, MA (US); Geoffrey M. Clemm, Concord, MA (US); George P. DeCandio, Cary, NC (US); Brian P. Steele, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/921,169

(22) Filed: Oct. 23, 2015

(65) Prior Publication Data

US 2016/0350109 A1 Dec. 1, 2016

Related U.S. Application Data

(63) Continuation of application No. 14/723,899, filed on May 28, 2015.

(51) Int. Cl.
*G06F 9/44* (2006.01)

(52) U.S. Cl.
CPC .................................. *G06F 8/71* (2013.01)

(58) Field of Classification Search
None
See application file for complete search history.

(56) References Cited

U.S. PATENT DOCUMENTS

| 6,266,811 B1* | 7/2001 | Nabahi | G06F 8/61 |
| | | | 717/115 |
| 8,484,638 B2* | 7/2013 | Tal | G06F 8/65 |
| | | | 709/220 |

(Continued)

OTHER PUBLICATIONS

Schmietendorf et al., Process Models for the Software Development and Performance Engineering Tasks, Proceedings of the 3rd International Workshop on Software and Performance (WOSP '02), 2002, pp. 211-218.*

(Continued)

*Primary Examiner* — Anil Khatri
*Assistant Examiner* — Timothy Duncan
(74) *Attorney, Agent, or Firm* — Cuenot, Forsythe & Kim, LLC (57) ABSTRACT

A user input initiating delivery of a first change set to a stream maintained by an artifact management application can be detected. A first set of elements and a first set of elements types associated with the first change set can be identified. A second set of element types that pertain to at least one unit of work identified for the first set of elements can be identified. A second set of elements that are involved in the same unit of work can be identified. A second change set modifying the second set of elements can be identified. A third change set modifying at least one element type can be identified. A change set group can be created and the first change set, the second change set and the third change set can be added to the change set group. The change set group can be delivered to the stream.

7 Claims, 5 Drawing Sheets

(56) References Cited

U.S. PATENT DOCUMENTS

| | | | |
|---|---|---|---|
| 2011/0161931 A1 | 6/2011 | Camelon et al. | |
| 2013/0024847 A1* | 1/2013 | Browne | G06F 11/3692 717/131 |
| 2013/0061177 A1* | 3/2013 | Santos-Gomez | G06F 9/4443 715/825 |
| 2013/0061200 A1* | 3/2013 | Roberts | G06F 8/10 717/100 |
| 2013/0326480 A1* | 12/2013 | Clemm | G06F 8/71 717/122 |
| 2014/0068558 A1 | 3/2014 | Mowatt et al. | |
| 2015/0082281 A1* | 3/2015 | Koenig | G06F 11/008 717/124 |

OTHER PUBLICATIONS

Dhlamini et al., "Intelligent Risk Management Tools for Software Development", Proceedings of the 2009 Annual Conference of the Southern African Computer Lecturer' Association, 2009, pp. 33-40.*

List of IBM Patents or Patent Applications Treated as Related, 2 pg.

Akbulut, M. et al., "Configuration Management of Engineering Artifacts with Automatic Identification of Related Change Sets Based on Type System", U.S. Appl. No. 14/723,899, filed May 28, 2015, 29 pages.

Murta, L. G. P. et al., "Towards Component-based Software Maintenance via Software Configuration Management Techniques," In Workshop on Modern Software Maintenance (WMSWM), 2004, 8 pg.

"Managing Change Histories," [online] IP.com Prior Art Database, IPCOM000225062D, Jan. 23, 2013, retrieved from the Internet: <https://priorart.ip.com/IPCOM/000225062>, 5 pg.

\* cited by examiner

Detect a user input initiating delivery of a first change set to a stream maintained by an artifact management application
405

Identify, using a processor, a first set of elements associated with the first change set and a first set of elements types associated with the first change set, the first set of element types defined by a type system associated with the artifact management application
410

Identify a second set of element types that pertain to at least one unit of work identified for the first set of elements
415

Identify a second set of elements that are involved in the same unit of work identified for the first change set
420

Identify at least a second change set that modifies the second set of elements
425

Identify at least a third change set that modifies at least one element type selected from a group consisting of the first set of element types and the second set of element types
430

Create a change set group and adding to the change set group the first change set, at least the second change set and at least the third change set
435

Deliver the change set group to the stream
440

CONFIGURATION MANAGEMENT OF ENGINEERING ARTIFACTS WITH AUTOMATIC IDENTIFICATION OF RELATED CHANGE SETS BASED ON TYPE SYSTEM

BACKGROUND

The present invention relates to artifact management, and more specifically, to artifact management applications.

Engineering assets sometimes are stored in artifact management applications, such as a requirements management system, a quality management system or a test management system. Such artifact management applications often are record-based and store core engineering artifacts and their properties (such as a requirement and/or test cases), links among the artifacts (such as traceability links), and other auxiliary artifacts that are complimentary to core artifacts (such as tags of an artifact or category of a test case). Core engineering artifacts and links are typically associated with a type system, which defines their properties, and data types associated with these properties.

SUMMARY

A method includes detecting a user input initiating delivery of a first change set to a stream maintained by an artifact management application. Responsive to detecting the user input, a change set group can be created and delivered to the stream. For example, a first set of elements associated with the first change set and a first set of elements types associated with the first change set can be identified using a processor. The first set of element types can be defined by a type system associated with the artifact management application. A second set of element types that pertain to at least one unit of work identified for the first set of elements can be identified. A second set of elements that are involved in the same unit of work identified for the first change set can be identified. At least a second change set that modifies the second set of elements can be identified. At least a third change set that modifies at least one element type selected from a group consisting of the first set of element types and the second set of element types can be identified. A change set group can be created and the first change set, at least the second change set and at least the third change set can be added to the change set group. The change set group can be delivered to the stream.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to artifact management, and more specifically, to artifact management applications. In accordance with the inventive arrangements disclosed herein, an artifact management application (e.g., a requirements management system, a quality management system or a test management system) can leverage a type system in order to automatically detect semantic dependencies between change sets and use this information to simplify artifact management. For example, the artifact management application can identify different change sets, which may be created by different users, changing different artifacts that are part of a single unit of work (e.g., "requirement work unit," an "electrical component work unit" or a "system test work unit"), and group these different change sets into a single change set group. In another example, the artifact management application can identify different change sets changing an artifact type and artifacts of that type, and group these different change sets into a single change set group.

Several definitions that apply throughout this document now will be presented.

As defined herein, the term "artifact management application" means an application with configuration management capabilities used to manage artifacts (e.g., engineering artifacts) for a project, product or system.

As defined herein, the term "type system" means definitions for artifacts and links (e.g., properties of engineering artifacts, permitted combinations of links, and definitions of work units), and data types associated with the properties. A part or all of the type system definitions can be versioned.

As defined herein, an "element" associated with a change set or involved in a unit of work means an artifact or link.

As defined herein, the term "element type" means a type assigned to an element, for example an artifact type assigned to an artifact or a link type assigned to a link.

As defined herein, the term "artifact" means a computer-based structure created to represent a reusable unit. An artifact can represent a tangible object or an intangible object. Examples of artifacts include, but are not limited to, reusable units that represent a product (e.g., an article of manufacture, an application, a service, a system, or the like), a component of an assembly, a component of program code (e.g., a function, a method, a module, etc.), an entire document, a component of a document (e.g., a section, a chapter, etc.), a drawing (e.g., a computer-aided design (CAD) drawing), a bill of materials, computer-program code (e.g., a modules, routine, sub-routine, or the like), a procedure, and the like. An artifact, for instance, can comprise information (e.g., data) pertaining to a reusable unit that may be reused among different assemblies, different groups of program code, etc.

As defined herein, the term "engineering artifact" means an artifact representing, or otherwise associated with, artifacts that are used in an engineering project (e.g., a requirement, a use case, a test plan, etc.). An engineering artifact can be, for example, composed of a single core artifact (e.g., requirement) or a set of a core and one or more auxiliary artifacts (e.g., a requirement and its folders, tags, etc.).

As defined herein, the term "core artifact" means a primary artifact. Examples of a core artifact include, but are not limited to, a requirement, a use case, a test plan, a test case, a feature, a configuration, a priority, a story, a task, and the like.

As defined herein, the term "auxiliary artifact" means an artifact that is complimentary to a core artifact. Examples of an auxiliary artifact include, but are not limited to, an attribute, a tag, a category, etc. of one or more core artifacts.

As defined herein, the term "link" when used with regard to artifacts means a direct association created between at least two artifacts. A link can be implemented using a link artifact. A link with regard to artifacts is distinct from a communication link established in a communication network.

As defined herein, the term "unit of work" means a recoverable sequence of operations within a process and/or components used in the process. A unit of work can, for example, include resources such as a use case, test plan, and corresponding test cases used to test one or more components of a process, product or system.

As defined herein, the term "stream" means a repository object representing a configuration identifying a mutable set of resources, with mutable states and/or different versions. A stream typically serves as an area for ongoing development of a project, product or system and integrates work generated by various users in repository workspaces. Team members deliver their changes to the stream and accept changes from other team members into their repository workspaces from the stream.

As defined herein, the term "workspace" means an isolated, access-controlled repository that is used to make changes to elements (e.g., artifacts, etc.) being managed without affecting elements and users outside the area.

As defined herein, the term "change set" means a repository object that collects a related group of modifications made to one or more elements (e.g., artifacts, etc.) of a stream. A change set typically is created by a user in a workspace.

As defined herein, the term "modify" when used with regard to a set of elements or a set of element types means to add one or more elements or element types to the set, update one or more elements or element types in the set and/or delete one or more elements or element types from the set.

As defined herein, the term "impact" means to have a direct effect on.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

Figure 1:
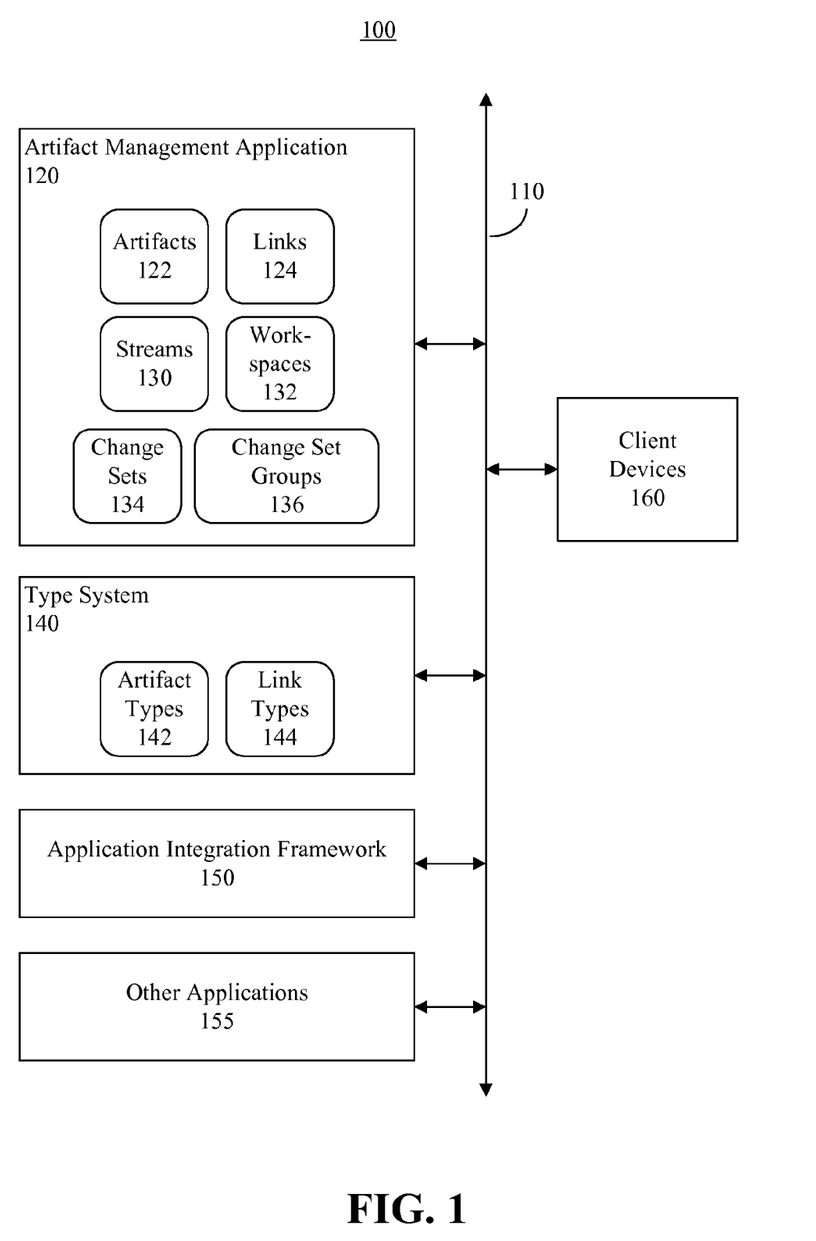
FIG. 1 is a block diagram illustrating an example of a system used for managing artifacts.

FIG. 1 is a block diagram illustrating an example of a system 100 used for managing artifacts. The system 100 can include an artifact management application 120, for example as a requirements management system, and a type system 140. In one arrangement, the type system 140 can be a component of the artifact management application 120, though the present arrangements are not limited in this regard. For example, the type system 140 can be an application separate from the artifact management application 120. A suitable application integration framework 150, for example a life cycle management framework, can be used to enable the artifact management application 120 and the type system 140 to communicate with one another. Further, the application integration framework 150 can able the artifact management application 120 and the type system 140 to communicate with one or more other applications 155 distinct from the artifact management application 120 and/or the type system 140, such as a design management system. The artifact management application 120 and/or type system 140 can interface with such other application(s) 155 to access artifacts and/or change sets defined in the other applications and include such artifacts and/or change sets in the processes described herein.

The artifact management application 120 and type system 140 can be embodied as executable program code (e.g., software) executing on one or more processing systems, each of such processing systems including at least one processor and memory elements. For example, the artifact management application 120 and type system 140 can be executed on a single processing system, or executed among a plurality of processing systems that are communicatively linked, for example via a network 110. A processing system can be, for example, a server or other processing system suitable for implementing the processes described herein.

The network 110 is the medium used to provide communications links between various devices and processing systems connected together within system 100. The network 110 may include connections, such as wire, wireless communication links, or fiber optic cables. The network 110 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or the like.

The system also can include a plurality of client devices 160 communicatively linked to the artifact management application 120, the type system 140 and the other application(s) 155, if present, via the network 110. Via the client devices 160, users (e.g., administrators, developers, engineers, marketing personnel, sales personnel, etc.) interact with the artifact management application 120, type system 140 and the other application(s) 155 (if present) to enter data, retrieve data, and so on. Examples of client devices 160 include, but are not limited to, workstations, desktop computers, laptop computers, mobile computers, netbook computers, tablet computers, smart phones, and the like.

The artifact management application 120 can store various elements being managed for a project, product or system, for example artifacts 122 (e.g., engineering artifacts, including core artifacts and auxiliary artifacts), properties of the artifacts 122 and links (i.e., link artifacts) 124. The elements can be stored to suitable data storage devices, for example in one or more record management systems, databases, triple stores, or the like. The artifact management application 120 also can maintain one or more streams 130 for the project, product or system, and one or more workspaces 132, accessible by users via the client devices 160, in which users may generate change sets 134 creating, modifying and deleting elements. The artifact management application 120 also can generate change set groups 136, as will be described herein.

One or more other applications 155 also can store various elements being managed for a project, product or system, properties of the artifacts and links, etc. In one arrangement, links artifacts 124 can be defined to link artifacts in the artifact management application 120 and artifacts in the other application(s) 155.

Via the client devices 160, users may access the type system 140 to define artifact types 142 (e.g., names and attributes) and link types 144 (e.g., names, roles and participating artifact types) for artifacts 122 and links 124 defined in the artifact management application 120 and, optionally, the other application(s) 155. Use of the artifacts 122 and links 124 in the artifact management application 120 and the other application(s) 155 can be governed by the types 142, 144 defined by the type system 140.

Figure 2:
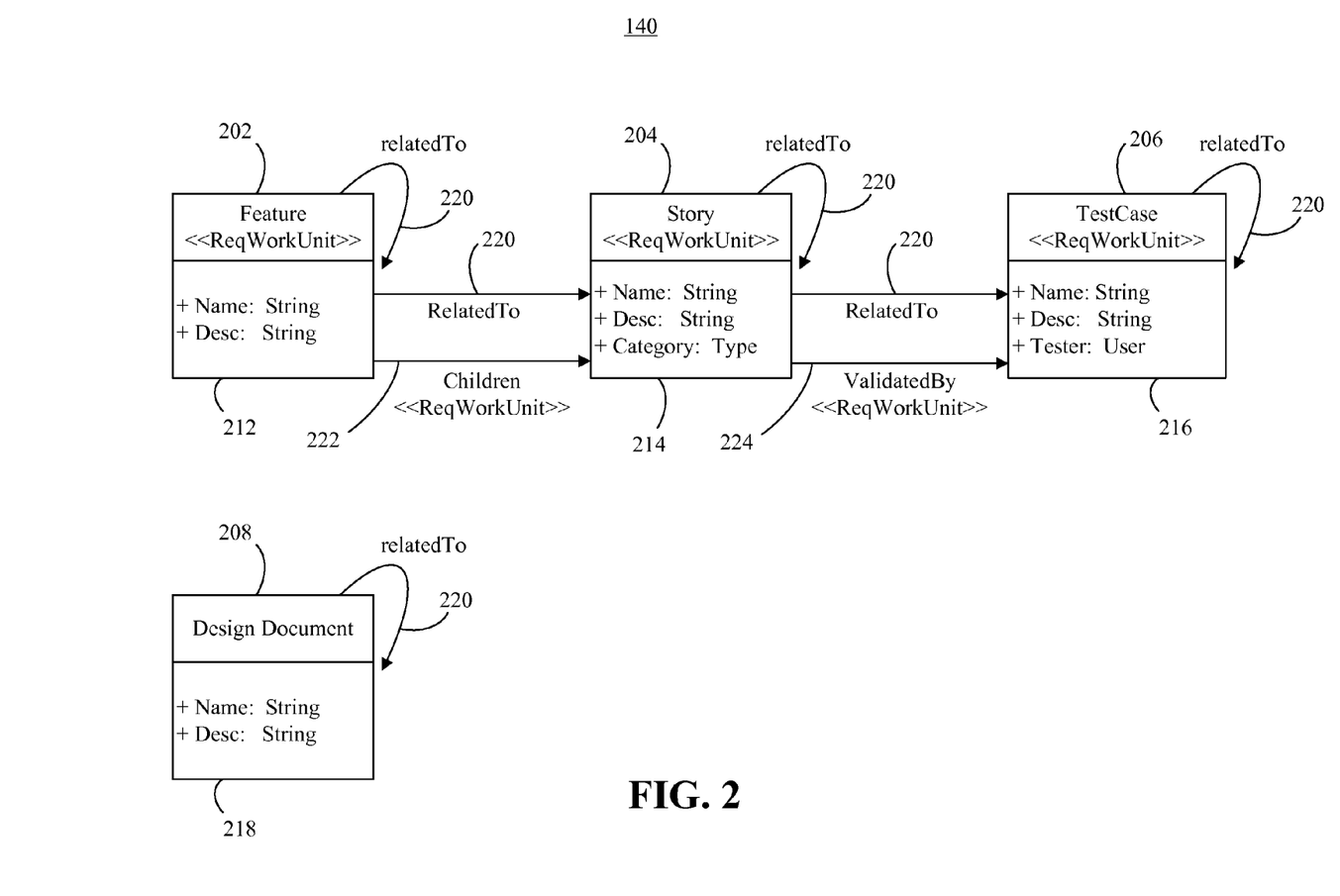
FIG. 2 depicts an example type system.

FIG. 2 depicts an example type system 140. The type system 140 can store element type information (e.g., artifact types and link types) defined by users for various elements (e.g., artifacts 122 and links 124) used, or to be used, in streams maintained by the artifact management application 120. For example, the type system 140 can include a "Feature" artifact type 202, a "Story" artifact type 204, and a "TestCase" artifact type 206, each of which can be defined to be a component of a "ReqWorkUnit" type artifact. The type system 140 also can include other artifact types for artifacts than are not components of a "ReqWorkUnit" type artifact, for example a "Design Document" artifact type 208. Any other artifact types can be defined and the present arrangements are not limited to these examples.

For each artifact type 202-208, a user can create relationships between the artifact type and artifacts 212, 214, 216, 218 to which the artifact type is to be assigned. For example, for each of the artifacts 212, 218, a user can enter a string value for the name of the artifact and a string value for the description of the artifact. In addition to the name and description, for the "Story" artifact type 204, a user can enter a type value for the category of each story artifact 214, and for the "TestCase" artifact type 206 a user can enter a name of a tester assigned to the test case artifact 216. Still, any other values can be assigned to the artifacts 212-218 and the present arrangements are not limited in this regard.

With the type system 140, a user also can define a link types for links 124 linking various artifacts. For example, a user can define a "relatedTo" link type 220 to be assigned to links between feature artifacts 210 and story artifacts 214 and to be assigned to links between story artifacts 214 and test case artifacts 216. The "relatedTo" link type 220 also can be assigned to links between artifact types 204-208 and the artifacts 210-218 to which the artifact types 204-208 are assigned. A user also can define a "Children" link type 222 for links between artifacts that are components of a "ReqWorkUnit" type artifact. For example, the "Children" link type 222 can indicate that a story artifact 214 is a child of the feature artifact 212. Further, a user also can define a "ValidatedBy" link type 224 for links between artifacts that are components of a "ReqWorkUnit" type artifact. For example, the "ValidatedBy" link type 224 can indicate that a test case artifact 216 is used to validate a story artifact 214.

Figure 3:
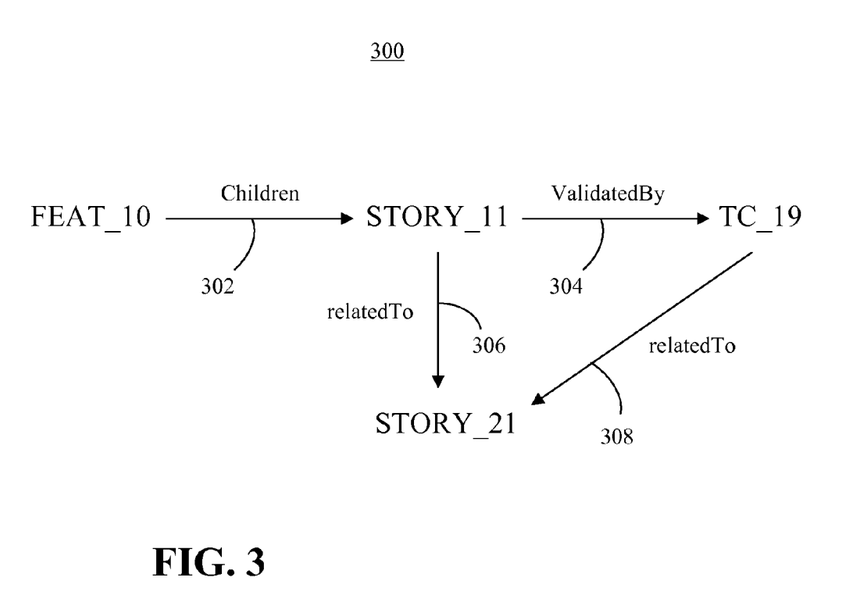
FIG. 3 depicts example artifacts based on a type system.

FIG. 3 depicts example artifacts 300 based on a type system, such as the type system 140. In this example, artifacts 122 named "FEAT_10," "STORY_11, "TC_19" AND "STORY_21" are presented. A "Children" link type is assigned to the link 302 between the "FEAT_10" artifact and the "STORY_11" artifact to indicate that the "STORY_11" artifact is a child of the "FEAT_10" artifact. Since the "Children" link type is assigned to artifacts that are components of the same "ReqWorkUnit" type artifact, the "Children" link type can indicate that the "FEAT_10" and "STORY_11" artifacts are components of the same unit of work. A "ValidatedBy" link type is assigned to the link 304 between the "STORY_11" artifact and the "TC_19" artifact. Again, since the "ValidatedBy" link type is assigned to artifacts that are components of the same "ReqWorkUnit" type artifact, the "ValidatedBy" link type can indicate that the "STORY_11" and "TC_19" artifacts are components of the same unit of work. Further, the "relatedTo" link type can be assigned to link 306 between the "STORY_11" artifact and the "STORY_21" artifact and to the link 306 between the "TC_19" artifact and the "STORY_21" artifact. The "relatedTo" link type can indicate that the "STORY_11" and "TC_19" artifacts are related to the "STORY_21" artifact.

Referring to FIG. 1, in operation, users can work in the workspaces 132 to generate change sets 134. Such change sets can include creation, modification and/or deletion of one or more artifacts 122 and/or link artifacts 124. Responsive to receiving one or more user inputs to deliver the change sets 134 to the stream 130, the artifact management application 120 can add multiple change sets to a change set group 136, and deliver the change set group 136 to the stream. Different users may work on different artifacts 122 in different change sets 134, and, from the user perspective, each change set 134 may appear to merely constitute a single artifact with its integral properties. This oftentimes is not the case, though. Changes to one artifact 122 may affect a unit of work to which the artifact 122 is assigned, or may affect other change sets 134 being created by other users. The present arrangements, however, do not merely treat artifacts 122 as individual versioned resources, but instead detect semantic dependencies between change sets 134 and assign such change sets 134 to a change set groups 136 which synchronizes relevant changes to artifacts 122 across change sets 134.

For example, the artifact management application 120 can identify different change sets 134 changing different artifacts 122 that are part of a single unit of work (e.g., a use case, test plan and its test cases), and group these different change sets 134 into a single change set group 136. In another example, the artifact management application 120 can identify different change sets 134 changing an artifact type 142 and artifacts 122 of that type, and group these different change sets 134 into a single change set group 136. Thus, when the change sets 134 are delivered to the stream 130, the integrity of the stream 130 is maintained.

In illustration, consider the following change sets, CS1, CS2, CS3 and CS4, made for a particular stream 130:
CS1 <admin>:
Story type—new priority attribute is added to artifact type Story
CS2 <user1>:
Story_11—description and priority attribute updated
CS3 <user2>:
TestCase_19—name attribute updated Children_399—link artifact is created to link Story_11 and TestCase_19
CS4 <user2>:
relatedTo_299—link artifact is created to link Story_11 and Story_21

Further, assume that user2 enters a user input to deliver change set "CS2" to the stream 130.

In this example, the change set "CS2" updates the description and priority attribute of the artifact "Story_11." Initially, the artifact management application 120 can identify a first set of elements, including one or more elements, and a first set of element types, including one or more element types, involved in change set "CS2." Thus, the artifact "story_11" can be identified as the first set of elements and the artifact type "Story" can be identified as the first set of elements. The artifact type "Story" can indicate that "story_11" is a required work unit. The first set of elements can be defined in, and maintained by, the artifact management application 120. The first set of element types can be defined in, and maintained by, the type system 140.

In this example, the artifact management application 120 also can identify a second set of element types that pertain to the story artifact. For example, the artifact "Story_11" may indicate a unit of work unit, assigned a "ReqWorkUnit" artifact type 142 defined by the type system 140, specifying artifacts 122 such as a test plan, use case and one or more test cases. Thus, the second set of element types can include artifact types 142, such as a test plan type (e.g., "TestPlan"), a use case type (e.g., "UseCase") and a test case type (e.g., "TestCase"). The second set of element types also can include link types 144 (e.g., "Children") between the story, test plan, use case and test case(s). In one arrangement, the second set of element types can be defined in, and maintained by, the type system 140. In another arrangement, the second set of elements types can be defined in, and maintained by, one or more other applications 155. In such arrangement, the artifact management application 120 can use the application integration framework 150 to access the second set of element types.

In addition, the artifact management application 120 can identify a second set of elements (e.g., artifacts) that are involved in the same unit of work identified for the first change set (e.g., indicated by the artifact "Story_11"). For example, the use case, test plan and test case(s) specified by "Story11" can be identified. The use case, test plan and test case(s) can be core artifacts, and their corresponding auxiliary artifacts also can be identified. The auxiliary artifacts can include, for example, an attribute, a tag, a category, etc. In one arrangement, the second set of elements can be defined in, and maintained by, the artifact management application 120. In another arrangement, the second set of elements can be defined in, and maintained by, one or more other applications 155. For example, the second set of elements can include specification artifacts applicable to the first set of elements. In such arrangement, the artifact management application 120 can use the application integration framework 150 to access the second set of elements.

The artifact management application 120 can identify at least one change set that modifies the second set of elements. In this example, the change set "CS3" updates a name attribute for the artifact "TestCase_19" and creates a link artifact "children_399" linking the artifact "Story_11" to the artifact "TestCase_19." Thus, the change set "CS3" modifies these elements. Accordingly, the artifact management application 120 can identify the change set "CS3" as being related to and/or impacting the change set "CS2."

The artifact management application 120 can identify at least one change set that modifies the first set of element types and/or the second set of element types. In this example, the change set "CS1" adds a new attribute to the artifact type "Story" contained in the first set of element types. Accordingly, the artifact management application 120 can identify the change set "CS3" as being related to and/or impacting the change set "CS2." Of course, if another change set modifies the Story, TestPlan, UseCase and/or TestCase types, such change set also can be identified.

The artifact management application 120 can create a change set group 136 and add to the change set group the change set for which delivery to the stream 130 is requested and each of the identified change sets. In this example, change sets "CS2," "CS3" and "CS1" can be added to the change set group 136. The artifact management application 120 can deliver the change set group 136 to the stream 130 to have each of the change sets in the change set group 136 (e.g., change sets "CS2," "CS3" and "CS1") applied to the stream 130.

In this example, the "relatedTo_299" link created in the change set "CS4" is not indicated as being associated with the required work unit "ReqWorkUnit." Accordingly, the artifact management application 120 can exclude the change set "CS4" from the change set group 136 because it does not have a semantic relationship to the other change sets "CS2," "CS3" and "CS1," which all pertain to the "ReqWorkUnit."

As noted, change sets also can be created in and/or maintained by one or more other applications 155, and such change sets can be identified in a manner similar to that described above to incorporate such change sets into the stream 130. For example, via the application integration framework 150, the artifact management application 120 can identify change sets defined in one or more other applications 155 that modify the second set of elements and/or modify element types. For example, one or more of the change sets "CS1," "CS3" and "CS4" can be created in one or more of the other applications 155.

Figure 4:
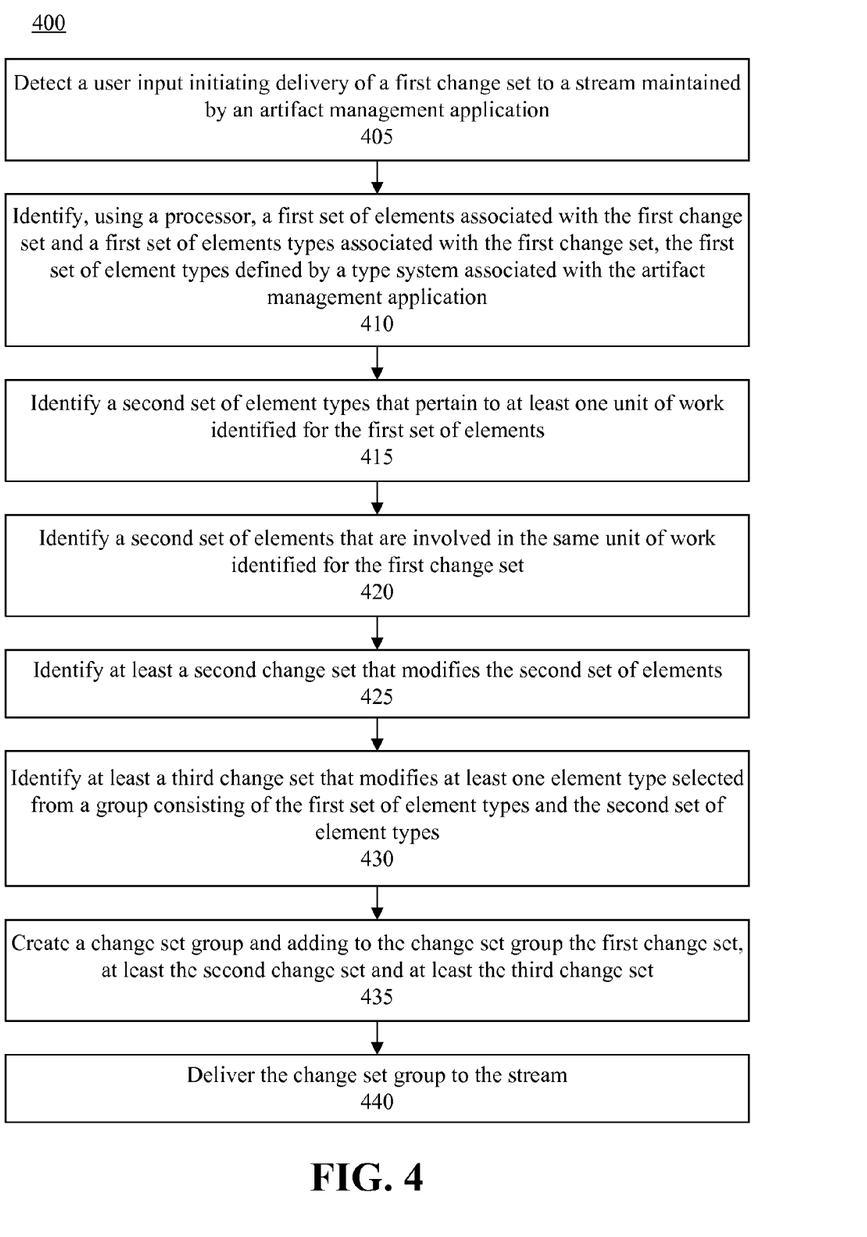
FIG. 4 is a flow chart illustrating an example of a method of creating a change set group and delivering the change set group to a stream.

FIG. 4 is a flow chart illustrating an example of a method 400 of creating a change set group and delivering the change set group to a stream. At step 405, a user input can be detected initiating delivery of a first change set to a stream maintained by an artifact management application. Responsive to detecting the user input, a change set group can be created and delivered to the stream. In illustration, at step 410, a first set of elements associated with the first change set, and a first set of elements types associated with the first change set, can be identified using a processor. The first set of element types can be defined by a type system associated with the artifact management application. At step 415, a second set of element types can be identified. The second set of element types can pertain to at least one unit of work identified for the first set of elements. At step 420, a second set of elements that are involved in the same unit of work identified for the first change set can be identified.

At step 425, at least a second change set that modifies the second set of elements can be identified. At step 430, at least a third change set that modifies at least one element type selected from a group consisting of the first set of element types and the second set of element types can be identified. At step 435, a change set group can be created. Further, the first change set, at least the second change set and at least the third change set can be added to the change set group. At step 440, the change set group can be delivered to the stream. In this regard, each of the change sets included in the change set group can be delivered to the stream.

At this point it should be noted that at steps 415 and 420, additional sets of element types that pertain to at least one unit of work identified for the first set of elements, and additional sets of elements that are involved in the same unit of work identified for the first change set, also can be identified in addition to the second set of element types and the second set of elements. Moreover, these additional sets of element types and elements can be created by one or more users in different streams. Such additional sets of element types and elements also can be process as described above to identify corresponding change sets, and those change sets also can be added to the change set group which is delivered to the stream.

Figure 5:
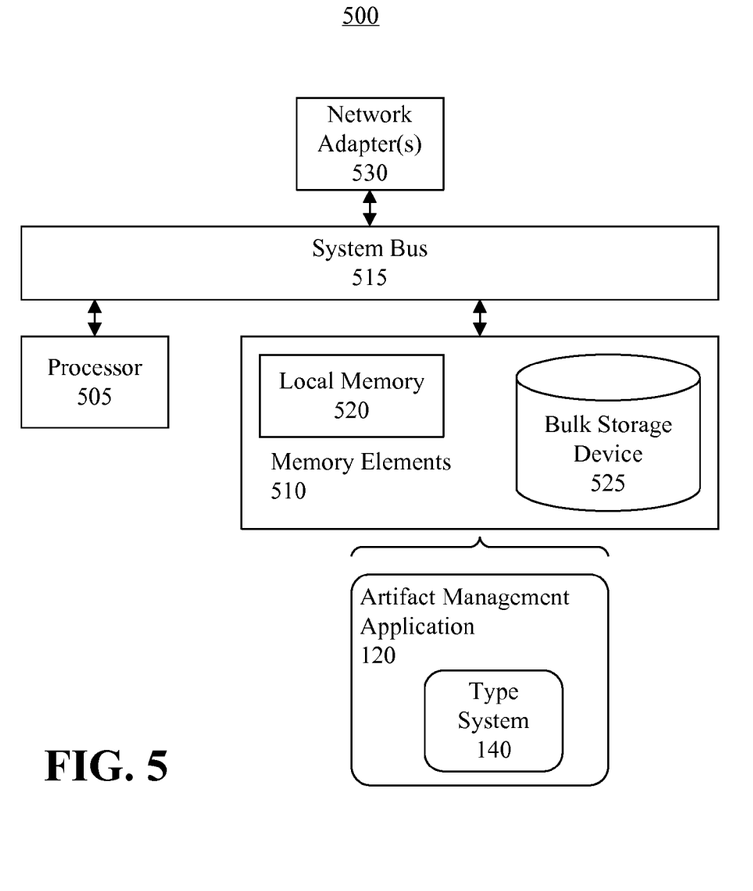
FIG. 5 is a block diagram illustrating example architecture for an artifact management system.

FIG. 5 is a block diagram illustrating example architecture for an artifact management system 500 hosting the artifact management application 120. The artifact management system 500 can include at least one processor 505 (e.g., a central processing unit) coupled to memory elements 510 through a system bus 515 or other suitable circuitry. As such, the artifact management system 500 can store program code within the memory elements 510. The processor 505 can execute the program code accessed from the memory elements 510 via the system bus 515. It should be appreciated that the artifact management system 500 can be implemented in the form of any system including a processor and memory that is capable of performing the functions and/or operations described within this specification. For example, the artifact management system 500 can be implemented as a server or other suitable data processing system.

The memory elements 510 can include one or more physical memory devices such as, for example, local memory 520 and one or more bulk storage devices 525. Local memory 520 refers to random access memory (RAM) or other non-persistent memory device(s) generally used during actual execution of the program code. The bulk storage device(s) 525 can be implemented as a hard disk drive (HDD), solid state drive (SSD), or other persistent data storage device. The artifact management system 500 also can include one or more cache memories (not shown) that provide temporary storage of at least some program code in order to reduce the number of times program code must be retrieved from the bulk storage device 525 during execution.

Input/output (I/O) devices, such as one or more network adapters 530, can be coupled to the artifact management system 500. The network adapter(s) 530 can be coupled to the artifact management system 500 either directly or through intervening I/O controllers. The network adapter(s) 530 can enable the artifact management system 500 to become coupled to other systems, computer systems, remote printers, and/or remote storage devices through intervening private or public networks. Modems, cable modems, transceivers, and Ethernet cards are examples of different types of network adapters 530 that can be used with the artifact management system 500.

As pictured in FIG. 5, the memory elements 510 can store the artifact management system 500, namely the artifact management application 120. The type system 140 can be a component of the artifact management application 120, or be an independent application. Being implemented in the form of executable program code, the artifact management application 120 can be executed by the artifact management system 500 and, as such, can be considered part of the artifact management system 500. Moreover, the artifact management application 120 is functional data structures that impart functionality when employed as part of the artifact management system 500 of FIG. 5. Further, artifacts, links, streams, workspaces, change sets, change set groups, artifact types and link types also can be stored to the memory elements 510 and are functional data structures that impart functionality when employed as part of the artifact management system 500.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   detecting a user input initiating delivery of a first change set to a stream maintained by an artifact management application;

responsive to detecting the user input:
   identifying, using a processor, a first set of elements associated with the first change set and a first set of elements types associated with the first change set, the first set of element types defined by a type system associated with the artifact management application;
   identifying at least one unit of work in which the first set of elements associated with the first change set are involved;
   identifying a second set of element types that pertain to the at least one unit of work in which the first set of elements associated with the first change set are involved;
   identifying a second set of elements that are involved in the at least one unit of work in which the first set of elements associated with the first change set are involved;
   identifying at least a second change set that modifies the second set of elements;
   identifying at least a third change set that modifies at least one element type selected from a group consisting of the first set of element types and the second set of element types;
   creating a change set group and adding to the change set group the first change set, at least the second change set and at least the third change set; and
   delivering the change set group to the stream.

2. The method of claim 1, wherein:
   the first set of elements associated with the first change set are artifacts defined in an artifact management application; and
   the first set of element types are defined by the type system.

3. The method of claim 2, wherein the type system is a component of the artifact management application.

4. The method of claim 2, wherein:
   the second set of elements are defined in an application distinct from the artifact management application; and
   the artifact management application accesses the second set of elements from the application distinct from the artifact management application using an application integration framework.

5. The method of claim 2, wherein:
   the second set of element types are defined in an application distinct from the type system; and
   the artifact management application accesses the second set of element types from the application distinct from the type system using an application integration framework.

6. The method of claim 1, wherein at least one change set selected from a group consisting of the second change set and the third change set is defined in an application distinct from the artifact management application.

7. The method of claim 1, wherein the second set of elements are defined by the type system.

* * * * *